Figure 1:
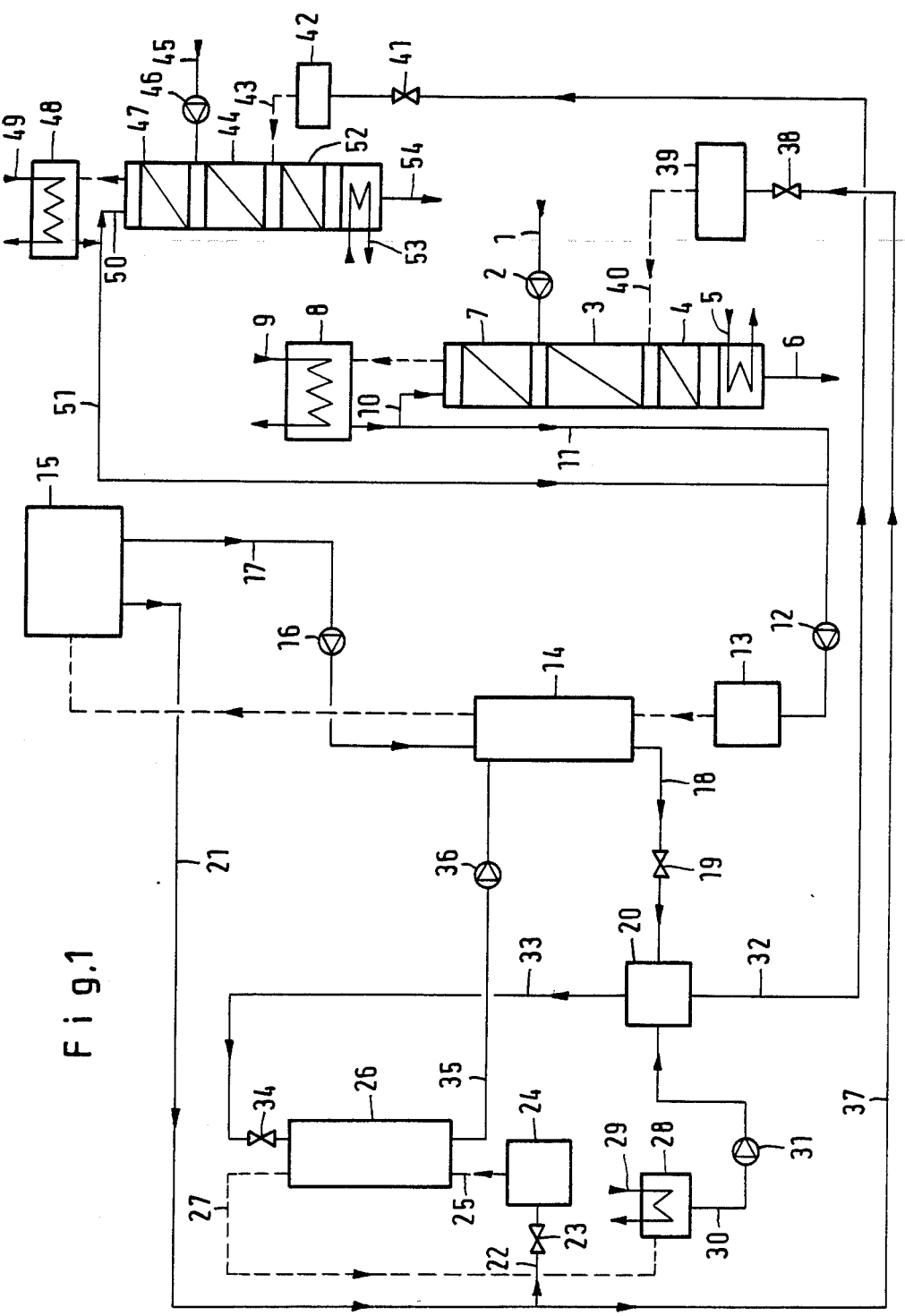

United States Patent [19]

Mandrin

[11] Patent Number: 4,564,515
[45] Date of Patent: Jan. 14, 1986

[54] METHOD FOR SEPARATING AT LEAST ONE HEAVY ISOTOPE FROM A HYDROGEN-CONTAINING MEDIUM

[75] Inventor: Charles Mandrin, Winterthur, Switzerland

[73] Assignee: Sulzer Brothers Limited, Winterthur, Switzerland

[21] Appl. No.: 606,376

[22] Filed: May 2, 1984

[30] Foreign Application Priority Data

May 5, 1983 [CH] Switzerland .......................... 2453/83

[51] Int. Cl.$^4$ .............................................. C01C 1/04
[52] U.S. Cl. .................................. 423/648 A; 423/249; 423/351; 423/359; 423/580
[58] Field of Search ........... 423/249, 351, 359, 648 A, 423/580

[56] References Cited

U.S. PATENT DOCUMENTS 4,213,953 7/1980 Mandrin .............................. 423/359
4,234,553 11/1980 Mandrin .............................. 423/359

Primary Examiner—Gregory A. Heller
Assistant Examiner—Wayne A. Langel
Attorney, Agent, or Firm—Kenyon & Kenyon

[57] ABSTRACT

The multi-stage process separates at least one heavy isotope from a hydrogen-containing compound or a hydrogen containing mixture, using ammonia synthesis and a mixture of hydrogen and nitrogen. The main product is water at least substantially free of deuterium and tritium, additional products being compounds enriched in deuterium and tritium, and nitrogen enriched in $^{15}N$.

5 Claims, 2 Drawing Figures

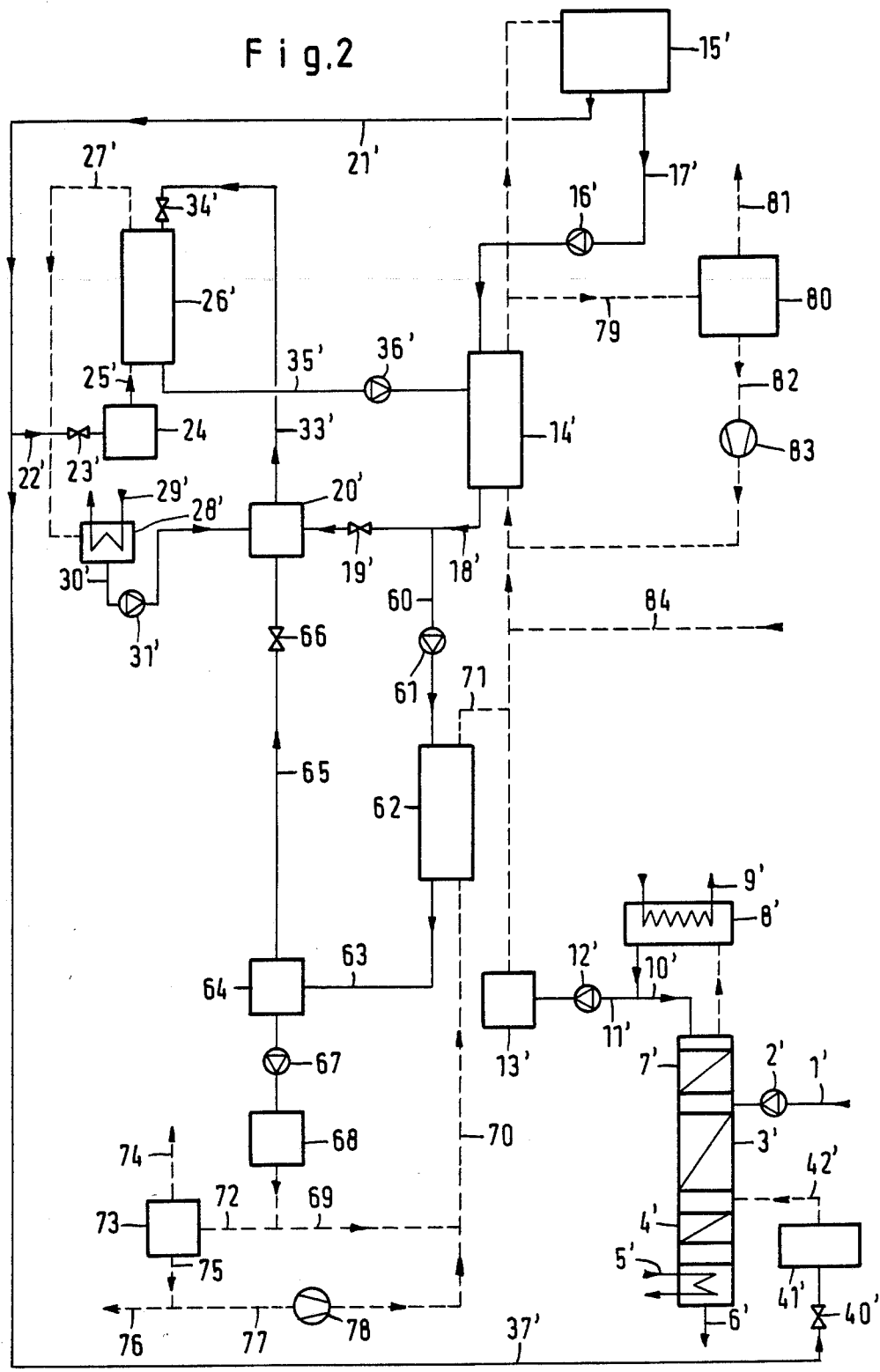

METHOD FOR SEPARATING AT LEAST ONE HEAVY ISOTOPE FROM A HYDROGEN-CONTAINING MEDIUM

The invention relates to a method of separating at least one heavy isotope from a hydrogen-containing medium. More particularly, this invention relates to a method of separating at least one heavy isotope from a hydrogen-containing compound or a hydrogen-containing mixture using ammonia synthesis and a hydrogen-nitrogen mixture.

A method of separating a heavy isotope from a hydrogen-containing medium is known e.g. from the book "NUCLEAR CHEMICAL ENGINEERING", Second Edition, by M. Benedict, Th. H. Pigford and H. W. Levi, McGraw-Hill Book Company, pages 763 to 765.

This method constitutes a monothermic ammonia-hydrogen exchange process in which ammonia enriched nearly 100% with deuterium is used as a starting product for obtaining water. In this case, the exchange process is an parasitic process combined with a method of obtaining ammonia from synthesis gas consisting of nitrogen and hydrogen having a natural deuterium concentration.

It is an object of the invention, to remove practically all the deuterium and tritium from deuterium and tritium-containing water to obtain water depleted in deuterium and tritium.

It is another object of the invention to obtain water free of deutrium and tritium.

It is another object of the invention to provide an economic method of obtaining deuterium and tritium depleted water as a main product and deuterium and/or tritium enriched by-products.

Briefly, the invention provides a method of separating at least one isotope from a hydrogen-containing medium which comprises the steps of bringing a flow of deuterium and tritium containing feed water into a first isotope exchange with a flow of ammonia vapor depleted in deuterium and tritium with the ammonia molar throughput being greater than two-thirds of the water molar throughput and deleting the flow of water almost completely of deuterium and tritium during the isotope exchange to obtain water depleted of deuterium and tritium as a product while enriching the flow of ammonia vapor in deuterium and tritium to obtain ammonia vapor enriched with deterium and tritium at a concentration lower than the concentration of deuterium and tritium in the feed water.

Thereafter, the enriched ammonia vapor is liquefied and then separated into a mixture of hydrogen and nitrogen. This mixture is brought into a second isotope exchange with a flow of liquid ammonia depleted of deuterium and tritium to deplete the mixture of hydrogen and nitrogen of deuterium and tritium while enriching the flow of liquid ammonia in deuterium and tritium.

Next, the depleted mixture of hydrogen and nitrogen is synthesized to obtain the liquid ammonia for said second isotope exchange with one part of the synthesized liquid ammonia being evaporated and re-cycled to the first isotope exchange.

The water can come e.g. from a river or can be water from a nuclear fuel processing plant or the cooling water or a moderator of an atomic reactor plant.

As is known, tritium is a dangerous radioactive substance, while low-deuterium water has been found to promote growth when used in agriculture.

In addition to the substances depleted in isotopes, the by-products of isotope exchange processes are other substances containing higher proportions of the isotopes than the feed material. A by-product enriched with deuterium, e.g. hydrogen or water, can then e.g. form the feed of a conventional process for obtaining heavy water, after tritium has been removed from the product in known manner. The tritium can be stored or, after concentration in known manner, can be used for nuclear fusion processes.

Since ammonia synthesis is used, ammonia need not be removed in the process as a product but only the leakage losses are to be compensated when operating the process.

In one embodiment of the invention, the part of the ammonia enriched with deuterium and tritium from the second isotope exchange is evaporated and brought into isotope exchange with a second stream of water. The water is then enriched with tritium and deuterium and obtained as a by-product, and the ammonia vapor depleted in deuterium and tritium is liquefied and mixed with the ammonia coming from the first isotope exchange before being decomposed into hydrogen and nitrogen.

In another advantageous embodiment, at least part of the liquid ammonia enriched with deuterium and tritium is brought into isotope exchange with a second hydrogen/nitrogen gas mixture enriched in deuterium and tritium and in the process is further enriched in deuterium and tritium. The second gas mixture is obtained from decomposition of the enriched ammonia. Part of the gas mixture is used as a by-product enriched in deuterium and tritium while another part of the gas mixture depleted in deuterium and tritium during isotope exchange is mixed with the gas mixture from the first isotope exchange which has been liquefied and separated into hydrogen and nitrogen.

According to another feature the method is also used to obtain isotope $^{15}N$ as a by-product in a more economic manner than hitherto. The $^{15}N$ isotope can then be used as a cooling gas for gas-cooled nuclear reactors or as "blanket" gas for light and heavy-water reactors.

Hitherto, only carbon dioxide and helium have been used as cooling gases and helium as a blanket gas for light and heavy-water reactors. Carbon dioxide, owing to its chemical instability under radiation, is suitable only in a temperature range from about 600° to 700° C. Owing to its solubility in water, carbon dioxide cannot be used as a washing gas for water reactors, since it forms a corrosive acid solution.

Helium is an expensive gas and, owing to its high permeability, requires a very seal-tight plant.

Hitherto, $^{15}N$ isotope has not been used industrially since it has been uneconomically expensive to produce, e.g., by distillation of nitrogen or liquid ammonia.

These and other objection and advantages of the invention will become more apparent from the following detailed description taken in conjunction with the accompanying drawings in which:

FIG. 1 illustrates a diagrammatic flow chart of a method in which a main product is water largely depleted of deuterium and tritium and a by-product is water enriched in deuterium and tritium; and FIG. 2 illustrates a diagrammatic flow chart of a method in which the main product is water largely depleted in deuterium and tritium whereas one by-product is hydrogen enriched in deuterium and tritium and another by-product is nitrogen enriched in $^{15}N$.

Referring to FIG. 1, in order to obtain deuterium and tritium-depleted water as a main product and deuterium and tritium-enriched water as a by-product from water already containing deuterium and tritium, the method is performed as follows:

A feed water, e.g. river water or waste water containing deuterium and tritium, is supplied through a line 1 by a pump 2 to an isotope exchange tower 3 and brought into isotope exchange in countercurrent with ammonia vapor depleted in deuterium and tritium with ammonia molar throughput being greater than two-thirds ($\frac{2}{3}$) of the water molar throughput, for reasons as explained below.

In the process, the water is substantially depleted of deuterium and tritium. The water, which is useful for agricultural or industrial purposes, still contains dissolved ammonia, which is undesirable for environmental reasons, ammonia consumption, etc. For this reason, the ammonia is removed in a column 4 adjacent the bottom part of the tower 3, the steam required for separation being produced by a heat source in the sump of column 4. The heat source can be a coil 5 heated with steam. The ammonia-free product is removed through a line 6.

The ammonia vapor leaving the top of tower 3 has a somewhat lower concentration of deuterium and tritium than the feed water, and contains water vapor which must not be present in subsequent steps of the process. The water vapor is therefore separated in a rectification column 7 disposed above the tower 3. The anhydrous ammonia vapor is liquefied in a condenser 8 by a water-cooled coil 9.

Part of the condensate is recycled to a line 10 to the column 7. Most of the condensate is conveyed through a line 11 by the pump 12 to a cracking oven 13 and converted in known manner into a synthesis gas mixture ($N_2 + 3H_2$). This gas mixture is introduced into an isotope exchange tower 14 and brought into exchange in counter-current with liquid ammonia. The isotope exchange can occur only if the liquid ammonia contains a dissolved catalyst, e.g. $KNH_2$ In the process, the hydrogen in the gas mixture loses deuterium and tritium whereas the ammonia becomes enriched in deuterium and tritium.

Ammonia is then formed from the gas mixture in a synthesis plant 15. Most of the deuterium and tritium-depleted ammonia is conveyed by a pump 16 through a line 17 to the top of the tower 14.

The ammonia enriched in deuterium and tritium during exchange with the synthesis gas mixture and containing a catalyst in solution is removed from the tower 14 through a line 18, expanded in a throttle valve 19 and introduced into a concentrator 20.

The rest of the ammonia formed in the systhesis plant 15 is removed through a line 21 with a part conveyed through a line 22 containing a throttle valve 23 and expanded in an evaporator 24. The ammonia vapor, depleted in deuterium and tritium, coming from the evaporator 24 is conveyed through a line 25 to an exchange tower 26 and brought into isotope exchange in counter-current with liquid ammonia enriched in deuterium and tritium. The resulting deuterium and tritium-enriched ammonia vapor is conveyed through a line 27 to a cooler 28 and there condensed by a cooling coil 29 through which cooling water flows. The condensate is removed through a line 30 and supplied through a pump 31 to the concentrator 20.

The concentrator 20 comprises a partial evaporator (not shown) which produces a stream of catalyst-free ammonia vapor from the liquids supplied through the lines 30 and 18, and a condenser (not shown) which liquefies the stream of vapor.

The liquefied ammonia, enriched in deuterium and tritium, is removed from the concentrator 20 through a line 32.

The partial evaporator incorporated in the concentrator 20 also produces an ammonia liquid enriched in catalyst, deuterium and tritium, which is removed from the concentrator 20 through a line 33 conveyed through a throttle valve 34 and expanded in the top part of the isotope exchange tower 26.

The ammonia depleted in deuterium and tritium and containing dissolved catalyst is taken from the bottom of the tower 26 through a line 35 and supplied by a pump 36 to the exchange tower 14.

The ammonia stream removed from the ammonia synthesis plant 15 through the line 21, minus the part with drawn through the line 22, is removed through a line 37 and, via a throttle valve 38, is expanded in an evaporator 39. The deuterium and tritium-depleted ammonia vapor is then supplied through a line 40 to the tower 3 to initiate the first process step i.e., the first isotope exchange.

The catalyst-free, deuterium and tritium enriched ammonia vapor taken from the concentrator 20 through the line 32 is expanded through a throttle valve 41 in an evaporator 42. From here, the ammonia vapor is supplied through a line 43 to an isotope exchange tower 44. A second stream of water, which can come from the same source as the first stream, is supplied to the top of the tower 44 through a line 45 and a pump 46 and brought into isotope exchange in countercurrent with ammonia vapor, as in the tower 3. In contrast to the first isotope exchange, the water becomes enriched with deuterium and tritium since the ammonia vapor is enriched in deuterium and tritium.

To separate the water vapor, the deuterium and tritium depleted ammonia vapor is introduced into a rectification column 47 and the ammonia vapor freed from water vapor is liquefied in a condenser 48 containing a coil 49 through which a cooling medium flows. Some of the condensate is recycled through a line 50 to the rectification column 47, whereas the much larger part of the condensate is removed through a line 51 and mixed with condensate taken from the condenser 8 through the line 11.

A column 52 for separating the ammonia dissolved in water is disposed below the tower 44, the steam required for separation being produced by a heat source in the sump of the column 52. The heat source can be a coil 53 heated with steam.

The ammonia-free, deuterium and tritium-enriched water is removed through a line 54. The water can be used as a feed for a heavy-water production plant or a tritium concentrating plant.

Referring to FIG. 2, the method may also be used to obtain water largely depleted of deuterium and tritium as a main product, hydrogen enriched with deuterium and tritium as a first by-product and nitrogen enriched with $^{15}N$ as a second by-product.

To avoid repetitions, those parts of the plant in FIG. 2 similar to the plant for performing a process corresponding to FIG. 1 are denoted by the same reference numbers plus a prime and operate in similar manner to the components in FIG. 1. For example, an exchange column 3' is supplied with river water or deuterium and tritium-containing waste water, and water substantially or completely freed from deuterium and tritium is removed through a line 6'.

As before, the entire plant is independent of a synthesis plant for industrial production of ammonia.

In contrast to the plant in FIG. 1, no catalyst-free, deuterium and tritium-enriched ammonia is removed and used to produce deuterium and tritium-containing water serving as an exchange agent. In the present case, an equivalent amount of liquid ammonia, still containing catalyst in solution, is removed through a line 60 connected the line line 18' and is conveyed through a pump 61 to an isotope exchange tower 62, where the liquid ammonia is brought into isotope exchange in countercurrent with a synthesis gas mixture ($N_2+3H_2$) enriched in deuterium and tritium. The ammonia and catalyst become enriched in deuterium and tritium, if required turning into pure $ND_3$ or pure $NT_3$, whereas the synthesis gas mixture become depleted in $^{15}N$.

The liquid depleted in deuterium, tritium and $^{15}N$ in the tower 62 flows through a line 63 to a concentrator 64, of similar construction to the concentrator 20 (FIG. 1) or 20' (FIG. 2).

Two flows are produced in the concentrator 64. One flow of liquid has a higher catalyst content than the flow leaving exchange tower 62. This liquid is enriched with deuterium and tritium and may contain $ND_3$ and/or $NT_3$, but is depleted in $^{15}N$ or completely free of $^{15}N$ if required, and after expansion is conveyed through a line 65 and throttle valve 66 to a concentrator 20', operating in similar manner to the concentrator 20 in FIG. 1.

A second flow of liquid in the concentrator 64 comprises $NH_3$ or $ND_3$ and/or $NT_3$ and is free from catalyst as well as being depleted in or completely free from $^{15}N$.

This second flow is conveyed by a pump 67 to a cracking oven 68 and, decomposed into $N_2+3H_2$ or $N_2+3D_2$ and/or $N_2+3T_2$.

Most of these gases are returned through lines 69, 70 to the isotope exchange tower 62, where they are depleted in $^{15}N$ and in deuterium and tritium, by the previously described method. The gas is then sent through a line 71 and combined with the synthesis gas from the cracking oven 13'.

The remaining decomposition products produced in the oven 68 are sent through a line 72 to a hydrogen/nitrogen separator 73 of known construction. The process occurring in the separator can be performed by low-temperature separation by liquefaction and distillation or by alternating selective absorption or through a selectively permeable diaphragm.

The gas mixture introduced into the separator 73 is decomposed into nitrogen and hydrogen. Nitrogen free from hydrogen and depleted in or free from $^{15}N$ is removed through a line 74. This nitrogen can be used for industrial purposes.

Some of the nitrogen-free hydrogen, enriched in deuterium and tritium, removed through a line 75 can be obtained as product through the line 76. The product can then be enriched in deuterium or tritium in a manner not shown, through at least one additional upstream stage.

Alternatively, the product can be burnt with oxygen to form water containing deuterium or tritium. The remaining flow is recirculated through a line 77 by a compressor 78 and added to the flow from the line 69, the gas mixture being sent through the line 70 to the exchange tower 62.

Ammonia depleted in deuterium and tritium through the line 37' but enriched in $^{15}N$ is expanded as in the method of FIG. 1 and evaporated and brought into isotope exchange with water which may or may not contain deuterium or tritium, so that ammonia enriched in $^{15}N$ flows through the line 11', the deuterium and tritium content corresponding to that of the feed water.

After leaving the tower 14', some of the synthesis gas depleted in deuterium and tritium is branched off through a line 79 from the gas supplied to the ammonia synthesis plant 15', and the branched-off gas is introduced into a known hydrogen-nitrogen separator 80.

In the separator 80, which can be constructed as the separator 73, the gas mixture is divided into two flows.

A first nitrogen flow, enriched with $^{15}N$ and preferably hydrogen-free, is withdrawn through a line 81.

A second gas flow, consisting mainly of hydrogen (but not necessarily free of nitrogen) is sent through a line 82 and a compressor 83 and mixed with the flow of gas introduced into the exchange tower 14'.

In this embodiment, nitrogen containing the natural concentration of $^{15}N$ is introduced into the plant through a line 84, to make up for the flow of product taken from the plant through the line 81 and the nitrogen taken through the line 74.

Alternatively, line 84 can be connected to the gas inlet of the tower 62 instead of to the inlet of tower 14'. The place where fresh nitrogen is injected will depend on the requirements of the process, particularly on the desired proportions of the $^{15}N$, deuterium and tritium products.

To summarise, in the embodiment in FIG. 2, the products consumed are fresh water or deuterium and tritium-containing waste water and nitrogen gas, whereas the main products are water at least substantially freed from deuterium and tritium through line 6', nitrogen enriched in $^{15}N$ through line 81 and hydrogen enriched in deuterium and tritium through line 76. The by-product is nitrogen depleted in $^{15}N$, which is removed through line 74.

The consumption of ammonia is extremely small and mainly due to leakages in the plant.

Finally, it may be advantageous to connect a number of identical plants according to FIG. 1 or FIG. 2 in series, in order to obtain products as required, more strongly enriched or depleted in the corresponding isotopes.

As an alternative to series connection, a single plant can be periodically operated, at least one product from one period being used as the feed for the next period.

If the products need to be completely pure, e.g. water completely free from deuterium and tritium or pure isotope $^{15}N$, conventional final enrichment or depletion stages such as distillation columns can be connected downstream of the product withdrawal points.

Numerical example

Plant for simultaneously depleting deuterium and tritium and obtaining heavy water or water enriched in deuterium.

Assumed capacity:

1. Removal of tritium from waste water:

3000 m$^3$/year waste water containing 200 Ci/m$^3$ tritium, coming from a nuclear fuel processing plant treating 1400 tons (t) per year, is to be brought to the legally permitted concentration of 0.03 Ci/m$^3$ 2. Deuterium-free water:

300 m³/h water containing less than 10 ppm D/D+H must be produced for agricultural purposes. The tritium concentration must be below 0.03 Ci/m³.

3. Heavy water:
The plant must produce a maximum amount of $D_2O$ or water enriched with deuterium.

Solution of problem 3000 m³/year waste water on 375 kg/h waste water containing 200 Ci/m³ $T_2O$ and 150 ppm D/D+H are first mixed with 299,625 kg/h fresh water containing 150 ppm D/D+H, to form a flow of 30,000 kg/h water containing 0.25 Ci/m³ $T_2O$ and 150 ppm D/D+H.

This water is used as the feed (compare FIG. 1, reference 1 and FIG. 2, reference 1') for a plant for producing deuterium and tritium depleted water.

The following Table gives numerical examples for three cases. Cases I and II correspond to the methods described above, in that the molar throughput of ammonia (see line "e") is more than two-thirds the molar throughput of water (see line "b"). Case III does not correspond to the previously-given conditions, in that the molar throughput of ammonia is less than two-thirds of the water throughput.

|  | CASE | | |
|---|---|---|---|
|  | I | II | III |
| Throughput in line 1 | | | |
| (a) in kg/h $H_2O$ | 300 000 | 300 000 | 300 000 |
| (b) in kmol/h $H_2O$ | 16 666 | 16 666 | 16 666 |
| (c) in kmol/h H | 33 332 | 33 332 | 33 332 |
| Throughput in line 40 or 42' | | | |
| (d) in kg/h $NH_3$ | 255 000 | 217 600 | 164 220 |
| (e) in kmol/h $NH_3$ | 15 000 | 12 800 | 9 660 |
| (f) in kmol/h H | 45 000 | 38 400 | 28 980 |
| Temperature of columns 3 or 3' (°C.) | 130 | 130 | 130 |
| Pressure in column 3 or 3' (bars) | 20 | 20 | 20 |
| $NH_3$ recycled from column 7 or 7' | | | |
| (g) in kg/h $NH_3$ | 165 642 | 163 332.49 | 160 036.042 |
| (h) in kmol/h H | 29 230.96 | 28 823.38 | 28 241.65 |
| $H_2O$ stripping vapor from column 7 or 7' | | | |
| (i) in kg/h $H_2O$ | 51 989.42 | 47 081.54 | 40 076.589 |
| (j) in kmol/h H | 5 776.608 | 5 231.282 | 4 452.954 |
| (k) Throughput of hydrogen atoms in the liquid in column 3 or 3' kmol/h H | | | |
| [Sum of (c) + (h) + (j)] | 68 339.57 | 67 386.6634 | 66 026.609 |
| 1. Throughput of hydrogen atoms in vapor rising in column 3 or 3', kmol/h | | | |
| [Sum of (f) + (h) + (j)] | 80 007.57 | 72 454.6634 | 67 674.609 |
| Separating factor for isotope exchange reaction $NH_3+HDO \rightarrow NH_2D+H_2O$ at 130° C. | 0.996 | 0.996 | 0.996 |
| Separating factor for isotope exchange reaction $NH_3+HTO \rightarrow NH_2T+H_2O$ at 130° C. | 0.98 | 0.98 | 0.98 |
| Number of isotope separating stages | 20 | 20 | 50 |
| Assumed efficiency of these stages (%) | 100 | 100 | 100 |
| Deuterium concentration in ppm for D/D + H in: | | | |
| Line 1 or 1' | 150 | 150 | 150 |
| Line 40 (FIG. 1) or 42' (FIG. 2) | 8.79 | 5.207 | 1.2252 |
| At vapor inlet into column 3 or 3' | 9.32 | 7.46 | 11.178 |
| At vapor outlet from column 3 or 3' | 112.49 | 126.7303 | 150.7476 |
| At liquid inlet into column 3 or 3' | 130.785 | 138.2404 | 150.370307 |
| At liquid outlet from column 3 or 3' | 10 | 10 | 20 |
| Tritium concentration in in mCi/kmol H in | | | |
| Line 1 or 1' | 2.25 | 2.25 | 2.25 |
| Line 40 or 42' | 0.265 | 0.2228 | 0.045 |
| At vapor inlet column 3 or 3' | 0.2672 | 0.245 | 0.1643 |
| at vapor outlet from column 3 or 3' | 1.7311 | 1.9415 | 2.32239 |
| At liquid inlet into column 3 or 3' | 1.98394 | 2.0941 | 2.2858967 |
| At liquid outlet from column 3 or 3' | 0.27 | 0.27 | 0.27 |
| Tritium concentration in water, Ci/m³ | | | |
| In line 1 or 1' | 0.25 | 0.25 | 0.25 |
| In line 6 or 6' (Product) | 0.03 | 0.03 | 0.03 |
| Heavy water extraction, corresponding to kg/h $D_2O$ | 46.66 | 46.66 | 43.33 |

As the numerical example shows, the feed water can be depleted to 10 ppm in only twenty separation stages if the molar throughputs are chosen in accordance with the methods of the invention. (Cases I and II).

The corresponding concentrations in line 40 (FIG. 1) or 42' (FIG. 2) are 8.79 and 5.207 ppm, corresponding to a depletion factor of 12.8 (Case I) and 24.3 (Case II) in tower 14 or 14'. Case III, which does not correspond to the molar throughput requirements of the invention, cannot attain the proposed depletion to 10 ppm.

Even to obtain 20 ppm, fifty separating stages instead of twenty are required, as shown by the numerical example.

In case III, the concentration in line 40 (FIG. 1) or 42' (FIG. 2) is 1.2252 ppm, corresponding to a depletion factor of 123.

The same applies to tritium, as shown in the Table.

The invention thus provides a relatively economic method of obtaining water free of deuterium and tritium as well as by-products enriched with deuterium and/or tritium or nitrogen enriched in the isotope $^{15}N$.

I claim:

1. A method of separating at least one heavy isotope from a hydrogen-containing medium comprising the steps of bringing a flow of deuterium and tritium containing feed water into a first isotope exchange with a flow of ammonia vapor depleted in deuterium and tritium with the ammonia molar throughput being greater than two-thirds of the water molar throughput;

depleting the flow of water almost completely of deuterium and tritium during said isotope exchange to obtain water depleted of deuterium and tritium as a product while enriching the flow of ammonia vapor in deuterium and tritium to obtain ammonia vapor enriched with deuterium and tritium at a concentration lower than the concentration of deuterium and tritium in the feed water;

thereafter liquefying the enriched ammonia vapor;

separating the enriched liquid ammonia into a mixture of hydrogen and nitrogen;

bringing a flow of the mixture of hydrogen and nitrogen into a second isotope exchange with a flow of liquid ammonia depleted of deuterium and tritium to deplete the mixture of deuterium and tritium while enriching the flow of liquid ammonia in deuterium and tritium;

synthesizing the depleted mixture of hydrogen and nitrogen to obtain the liquid ammonia for said second isotope exchange; and evaporating one part of the synthesized liquid ammonia and recycling said part to said first isotope exchange.

2. A method as set forth in claim 1 which further comprises the steps of evaporating a second part of the synthesized liquid ammonia;

bringing the enriched flow of liquid ammonia into a third isotope exchange with a flow of the evaporated second part of the synthesized ammonia to enrich said second part while depleting said liquid flow of deuterium and tritium; and recycling the depleted liquid flow from said third isotope exchange to said second isotope exchange.

3. A method as set forth in claim 1 which further comprises the steps of evaporating a part of enriched flow of liquid ammonia from said second isotope exchange;

bringing said evaporated part of enriched ammonia into a third isotope exchange with a flow of feed water to enrich the water while depleting the ammonia of deuterium and tritium;

obtaining the enriched water from said third isotope exchange as a by-product;

liquefying the depleted ammonia from said third isotope exchange; and thereafter mixing the liquefied ammonia from said third isotope exchange with the liquefied ammonia from said first isotope exchange prior to said step of separating the liquid ammonia into hydrogen and nitrogen.

4. The method as set forth in claim 1 which further comprises the steps of bringing at least a part of the enriched liquid ammonia from said second isotope exchange into a fourth isotope exchange with a second flow of deuterium and tritium enriched gas mixture of hydrogen and nitrogen to enrich the liquid ammonia while depleting the second flow of deuterium and tritium;

decomposing the enriched liquid ammonia from said fourth isotope exchange to obtain said second flow and gas mixture enriched with deuterium and tritium as a first by-product; and mixing the depleted second flow from said fourth isotope exchange with the mixture of hydrogen and nitrogen obtained from said first isotope exchange.

5. A method as set forth in claim 4 which further comprises the steps of separating said first by-product into pure nitrogen and pure hydrogen enriched with deuterium and tritium;

mixing a part of the pure enriched hydrogen with the gas mixture flowing to the fourth isotope exchange;

mixing nitrogen containing a natural concentration of $^{15}N$ with the gas mixture from the first isotope exchange upstream of the second isotope exchange decomposing a part of the gas mixture from the second isotope exchange and containing an enriched concentration of $^{15}N$ into nitrogen enriched with $^{15}N$ as a second by-product and hydrogen; and recycling the hydrogen to the gas mixture from the first isotope exchange upstream of the second isotope exchange.

* * * * *